No. 849,016. PATENTED APR. 2, 1907.
J. W. PATERSON.
SASH ADJUSTER.
APPLICATION FILED SEPT. 7, 1905.
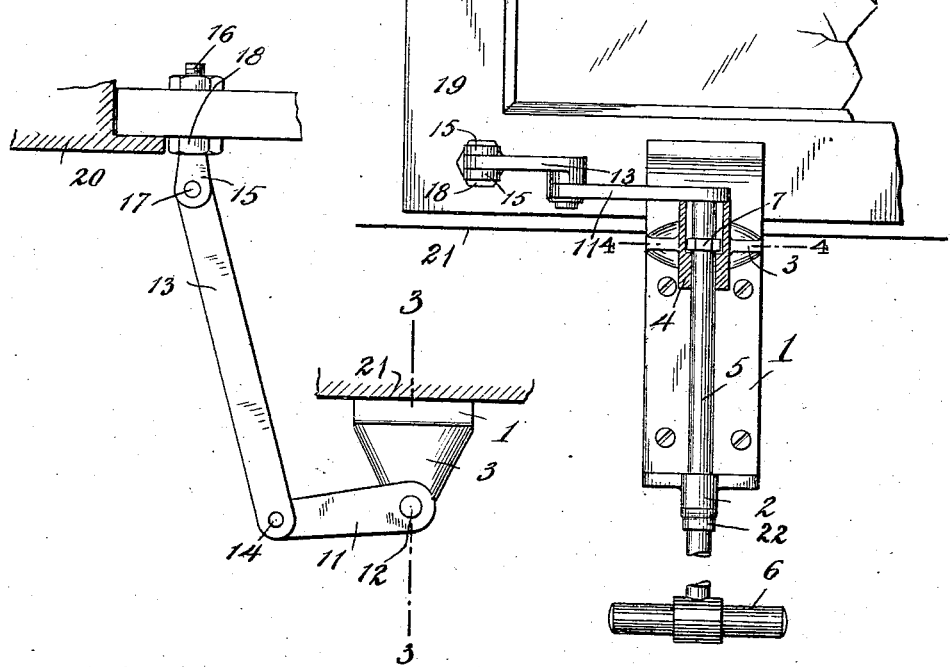
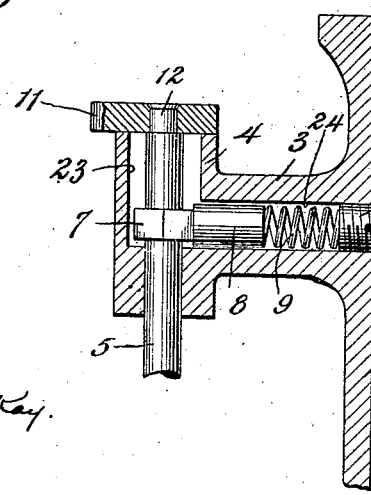
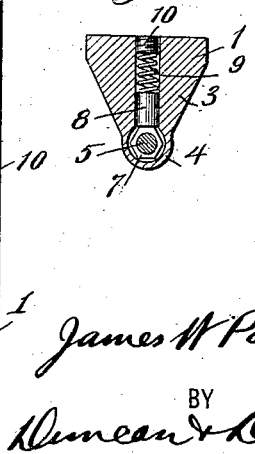
WITNESSES:
INVENTOR
James W Paterson
BY
Duncan & Duncan
ATTORNEYS

UNITED STATES PATENT OFFICE.

JAMES W. PATERSON, OF NEW CASTLE, PENNSYLVANIA.

SASH-ADJUSTER.

No. 849,016.  Specification of Letters Patent.  Patented April 2, 1907.

Application filed September 7, 1905. Serial No. 277,304.

*To all whom it may concern:*

Be it known that I, JAMES W. PATERSON, a citizen of the United States, and a resident of New Castle, in the county of Lawrence and State of Pennsylvania, have invented certain new and useful Improvements in Transom-Adjusters, of which the following is a specification, taken in connection with the accompanying drawings.

This invention relates to transom-adjusters, and relates especially to devices for adjusting and holding in position the deck-sashes of railway-cars.

In the accompanying drawings, showing an illustrative embodiment of this invention, Figure 1 is a front view; Fig. 2, a corresponding top view; Fig. 3, an enlarged partial vertical section on the line 3 3 of Fig. 2, and Fig. 4 is a horizontal section on the line 4 4 of Fig. 1.

In the illustrative embodiment of this invention shown in the drawings, 1 is a plate of suitable form to be securely attached to the car-body, as indicated. The bracket 3 is formed on this plate and carries at its outer end the sleeve 4, having a vertical bearing for the stem 5 at its lower portion, the recess 23 being formed to accommodate the friction-block 7, which is rigidly secured on the stem. If desired, another bearing-sleeve 2 may be provided at the lower end of the plate 1 to more effectively guide the stem 5, which, as indicated, has the collar 22 adjacent this sleeve and a suitable transverse handle 6 at its lower end. The friction-block 7 has a non-circular friction-surface to coöperate with a suitable spring-pressed retainer, such as 8, which is forced into coöperation with the friction-block by the spring 9, held in place by the plug 10. As indicated, all these parts are preferably located in the transverse aperture 24, formed in the bracket 3, which completely conceals them and which allows of their easy assembly, while at the same time preventing the access of dust or dirt.

Suitable connecting means are used between the stem and the sash 19, such as of the ordinary side hinged type and which is shown in engagement with the frame 20. The crank 11 is secured to the upper end of the stem by riveting the reduced upper portion 12 or otherwise, and the connector 13 is shown as engaging the crank through the pivot 14 and the fastening 15 through the pivot 17. This fastening may comprise the threaded stud 16, adapted to pass through the sash and be adjustably secured thereto by the nuts 18.

It is of course apparent that the spring-pressed retainer engages the friction-block so as to yieldingly hold it in adjusted position, so as to firmly hold the sash and connecting parts in closed position—for instance, as indicated—and at the same time take up any looseness of the parts and effectually prevent rattling. The engagement of the retainer and friction-block are such, however, that the parts may be readily manually adjusted, the form of friction-block being such as to allow the desired nicety of adjustment of the sash under working conditions.

Having thus described this invention in connection with an illustrative embodiment of the same, to the details of which I do not desire to be limited, what I claim as new, and what I desire to secure by Letters Patent, is set forth in the appended claims:

1. In sash-adjusters, a plate, a bracket projecting from said plate and provided with a bearing-sleeve having an enlarged hole at its upper end, a stem engaging said sleeve and provided with a depending handle, a friction-block on said stem, a spring-pressed retainer engaging said friction-block and located in an aperture in said bracket and connecting devices to be secured to a sash comprising a crank secured at the upper end of said stem adjacent said sleeve.

2. In sash-adjusters, a plate formed with outwardly-projecting brackets provided with bearing-sleeves, one of said bearing-sleeves being formed with an enlarged hole at one end, there being a coöperating transverse aperture in the bracket extending to the rear wall of said plate, an operating-stem in said sleeve and provided with connecting means, a friction-block on said stem and located within said hole and a retainer and operating-spring coöperating with said friction-block and located in said transverse aperture.

3. In sash-adjusters, a plate formed with outwardly-projecting brackets, bearing-sleeves on said brackets, one of said bearing-sleeves being provided with an enlarged hole at one end of the same and there being a coöperating transverse aperture in the adjacent bracket, a stem in said sleeves formed with a friction-block located in said hole and a spring-pressed retainer located in said aperture.

4. In sash-adjusters, a support having an apertured bracket extending out from the same, an apertured sleeve supported on the end of the bracket, the apertures of the bracket and sleeve communicating with each other, a stem rotatably mounted in the sleeve, an adjustable friction device yieldingly mounted in the aperture of the bracket and contacting with the outer face of the stem and connections from the stem to the sash to move the same.

5. In a deck-sash opener, in combination, a hollow bracket, a spindle journaled within the head of the bracket, a friction-block on the spindle and housed within the bracket-head and having a flattened face, the bracket being apertured to form at one end of the block a bearing for the spindle and at the other end an opening to admit the block, a spring-advanced plunger, within the shank of the bracket engaging the friction-block, a crank, and link connection for uniting the spindle with a deck-sash.

JAMES W. PATERSON.

Witnesses:
H. P. McIlwraith,
J. A. Weingartner.